US008769084B2

(12) United States Patent
Westerfeld et al.

(10) Patent No.: US 8,769,084 B2
(45) Date of Patent: Jul. 1, 2014

(54) SYSTEM AND METHOD FOR MODELING INTERDEPENDENCIES IN A NETWORK DATACENTER

(75) Inventors: Kurt Andrew Westerfeld, Ashburn, VA (US); John Ross Judson, Ashburn, VA (US)

(73) Assignee: Novell, Inc., Provo, UT (US)

( * ) Notice: Subject to any disclaimer, the term of this patent is extended or adjusted under 35 U.S.C. 154(b) by 245 days.

(21) Appl. No.: 12/868,426

(22) Filed: Aug. 25, 2010

(65) Prior Publication Data

US 2011/0302295 A1 Dec. 8, 2011

Related U.S. Application Data

(60) Provisional application No. 61/352,257, filed on Jun. 7, 2010.

(51) Int. Cl.
*G06F 15/173* (2006.01)

(52) U.S. Cl.
USPC ............................ 709/224; 709/204; 709/208

(58) Field of Classification Search
USPC .......................................... 709/224, 204, 208
See application file for complete search history.

(56) References Cited

U.S. PATENT DOCUMENTS

| | | | |
|---|---|---|---|
| 4,887,206 A | 12/1989 | Natarajan | 364/401 |
| 6,071,317 A | 6/2000 | Nagel | 717/4 |
| 6,278,694 B1 | 8/2001 | Wolf et al. | 370/253 |
| 6,282,546 B1 | 8/2001 | Gleichauf et al. | 707/102 |
| 6,286,047 B1 | 9/2001 | Ramanathan et al. | 709/224 |
| 6,301,668 B1 | 10/2001 | Gleichauf et al. | 713/201 |
| 6,311,192 B1 | 10/2001 | Rosenthal et al. | 707/200 |
| 6,526,387 B1 | 2/2003 | Ruffin et al. | 705/7 |
| 6,564,258 B1 | 5/2003 | Uniacke | 709/223 |
| 6,678,882 B1 | 1/2004 | Hurley et al. | 717/121 |
| 6,745,235 B2 | 6/2004 | Baca et al. | 709/217 |
| 6,938,081 B1 | 8/2005 | Mir | 709/223 |
| 6,944,656 B2 | 9/2005 | Evrard et al. | 709/223 |
| 7,007,089 B2 | 2/2006 | Freedman | 709/225 |
| 7,047,291 B2 | 5/2006 | Breese et al. | 709/223 |
| 7,337,184 B1 | 2/2008 | Or et al. | 707/102 |
| 7,340,768 B2 | 3/2008 | Rosenberger | 726/4 |

(Continued)

OTHER PUBLICATIONS

Kind et al., "Advanced Network Monitoring Brings Life to the Awareness Plane," Topics in Network and Service Management, Oct. 2008, pp. 140-147.*

(Continued)

*Primary Examiner* — Phuoc Nguyen
*Assistant Examiner* — Davoud Zand
(74) *Attorney, Agent, or Firm* — Pillsbury Winthrop Shaw Pittman LLP

(57) ABSTRACT

The system and method described herein may include a discovery engine that scans a network datacenter to inventory resources in the datacenter and populate a configuration management database with the resource inventory. One or more destination listeners created from the resource inventory may then selectively sample monitored flows in the datacenter to model interdependencies between the inventoried resources. For example, any monitored flows originating outside the datacenter or failing to correlate with the inventoried resources may be dropped, whereby the interdependencies may be modeled from a deliberately reduced sample of the monitored flows that have information relevant to modeling relationships between resources within the datacenter. Furthermore, directionalities for the monitored flows may be determined, wherein the directionalities provide further information relevant to modeling the relationships between the resources within the datacenter.

20 Claims, 5 Drawing Sheets

(56) References Cited

U.S. PATENT DOCUMENTS

| | | | |
|---|---|---|---|
| 7,398,398 B2 | 7/2008 | Ofek et al. | 713/180 |
| 7,543,052 B1 | 6/2009 | Cesa Klein | 709/224 |
| 7,675,878 B2 | 3/2010 | Simpson et al. | 370/310.2 |
| 7,698,730 B2 | 4/2010 | Nazzal | 726/1 |
| 7,733,803 B2 | 6/2010 | Vogel, III et al. | 370/254 |
| 7,962,616 B2 | 6/2011 | Kupferman et al. | 709/225 |
| 8,191,136 B2 | 5/2012 | Dudfield et al. | 726/22 |
| 2002/0032769 A1 | 3/2002 | Barkai et al. | 709/224 |
| 2002/0065921 A1* | 5/2002 | Davidson et al. | 709/227 |
| 2002/0194045 A1 | 12/2002 | Shay et al. | 705/8 |
| 2003/0126265 A1 | 7/2003 | Aziz et al. | 709/227 |
| 2003/0135596 A1 | 7/2003 | Moyer et al. | 709/223 |
| 2003/0217283 A1 | 11/2003 | Hrastar et al. | 713/200 |
| 2004/0015579 A1 | 1/2004 | Cooper et al. | 709/223 |
| 2004/0046785 A1 | 3/2004 | Keller | 345/734 |
| 2004/0049365 A1 | 3/2004 | Keller et al. | 702/186 |
| 2004/0049509 A1 | 3/2004 | Keller et al. | 707/100 |
| 2005/0229255 A1 | 10/2005 | Gula et al. | 726/23 |
| 2005/0240665 A1 | 10/2005 | Gu et al. | 709/220 |
| 2006/0064481 A1 | 3/2006 | Baron et al. | 709/224 |
| 2006/0064485 A1 | 3/2006 | Baron et al. | 709/224 |
| 2006/0064486 A1 | 3/2006 | Baron et al. | 709/224 |
| 2006/0095923 A1 | 5/2006 | Novack et al. | 719/318 |
| 2006/0125847 A1 | 6/2006 | Andreev et al. | 345/629 |
| 2006/0137009 A1 | 6/2006 | Chesla | 726/22 |
| 2006/0161466 A1 | 7/2006 | Trinon et al. | 705/7 |
| 2006/0230450 A1 | 10/2006 | Bu et al. | 726/22 |
| 2006/0291434 A1 | 12/2006 | Gu et al. | 370/338 |
| 2007/0039049 A1 | 2/2007 | Kupferman et al. | 726/22 |
| 2007/0056030 A1 | 3/2007 | Kay | 726/11 |
| 2007/0100712 A1 | 5/2007 | Kilpatrick et al. | 705/29 |
| 2007/0100892 A1 | 5/2007 | Kephart et al. | 707/200 |
| 2007/0179790 A1 | 8/2007 | Leitch et al. | 705/1 |
| 2007/0180107 A1 | 8/2007 | Newton et al. | 709/224 |
| 2007/0250812 A1 | 10/2007 | Sanghvi et al. | 717/117 |
| 2008/0005784 A1 | 1/2008 | Miliefsky | 726/3 |
| 2008/0016115 A1 | 1/2008 | Bahl et al. | 707/104.1 |
| 2008/0040455 A1 | 2/2008 | MacLeod et al. | 709/220 |
| 2008/0070523 A1 | 3/2008 | Masri et al. | 455/161.1 |
| 2008/0133517 A1 | 6/2008 | Kapoor et al. | 707/6 |
| 2008/0133518 A1 | 6/2008 | Kapoor et al. | 707/6 |
| 2008/0183873 A1 | 7/2008 | Banavar et al. | 709/226 |
| 2008/0263060 A1 | 10/2008 | Benantar et al. | 707/100 |
| 2009/0254652 A1 | 10/2009 | Binswanger et al. | 709/224 |
| 2010/0077078 A1* | 3/2010 | Suit et al. | 709/224 |
| 2011/0099158 A1 | 4/2011 | Magnuson et al. | 707/708 |
| 2011/0302290 A1 | 12/2011 | Westerfeld et al. | 709/223 |
| 2011/0302652 A1 | 12/2011 | Westerfeld | 726/22 |

OTHER PUBLICATIONS

B. Claise, Ed., "Request for Comments: 5101," Network Working Group, Jan. 2008, pp. 1-64.*

Alda, Sascha, et al., "Awareness and Workflow Based Coordination of Networked Co-Operations in Structural Design", *ITcon*, vol. 11, Jul. 2006, pp. 489-507.

Luo, Zongwei, et al., "Exception Handling for Conflict Resolution in Cross-Organizational Workflows", *Technical Report*, LSDIS Labs, Computer Science, Unviersity of Georgia, Apr. 10, 2002, 37 pages.

Riverbed® Cascade® Discovery Datasheet, No. DS-RCE021110, copyright 2010, Riverbed Technology, 8 pages.

Riverbed Cascade™ Discovery for BMC Atrium Product Information Sheet, copyright 2010, Riverbed Technology, 1 page.

Servin, Luis, et al., "Assessing Incident Severity in a Network and Automatic Defense Mechanisms", Presecure Consulting GmbH, part of the POSITIF project funded by the EC under Control No. IST-2002-002314. May 27, 2007, 14 pages.

VMWare Service Manager 9—Integration Platform, Solutions Overview, copyright 2010, VMware, Inc., 4 pages.

White Paper—"Novell® Architectural Foundation", A Technical Vision for Computing and Collaborating with Agility, www.novell.com, Jan. 23, 2009, 61 pages.

White Paper—"A Technical Overview of Novell® CMDB36O™", www.novell.com, Mar. 2009, 17 pages.

White Paper—"Automating Business Processes with EMC Documentum ApplicationXtender Workflow Manager", A Detailed Review, EMC Corporation, Jan. 2010, 10 pages.

Wikipedia—Graph (Data Structure), source: http://en.wikipedia.org/w/index.php?oldid=372633482, 3 pages.

* cited by examiner

SYSTEM AND METHOD FOR MODELING INTERDEPENDENCIES IN A NETWORK DATACENTER

CROSS-REFERENCE TO RELATED APPLICATIONS

This application claims the benefit of U.S. Provisional Patent Application Ser. No. 61/352,257, entitled "System and Method for Creating and Leveraging a Configuration Management Database," filed Jun. 7, 2010, the contents of which are hereby incorporated by reference in their entirety.

In addition, this application is related to U.S. patent application Ser. No. 12/868,475, entitled "System and Method for Detecting Real-Time Security Threats in a Network Datacenter," filed on Aug. 25, 2010, and U.S. patent application Ser. No. 12/868,507, entitled "System and Method for Managing Changes in a Network Datacenter," filed on Aug. 25, 2010, both of which further claim the benefit of U.S. Provisional Patent Application Ser. No. 61/352,257, and the contents of which are hereby incorporated by reference in their entirety.

FIELD OF THE INVENTION

The invention relates to a system and method for modeling interdependencies in a network datacenter, and in particular, to populating a configuration management database with an inventory of resources in the datacenter, collecting flows describing network activity observed within the datacenter, and deliberately dropping any of the collected flows that originate from outside the datacenter or otherwise fail to correlate with the resource inventory, whereby the interdependencies in the datacenter may be modeled from a deliberately reduced sample of the collected flows that have information relevant to modeling relationships between resources within the datacenter.

BACKGROUND OF THE INVENTION

Usage and quality for a configuration management database are often affected by the accuracy and timeliness of relationship information cataloged in the configuration management database. In particular, configuration management databases typically house information describing various information technology resources in a network datacenter in addition to relationships and other dependencies between the information technology resources. As such, configuration management databases typically contain equal or greater amounts of relationship information relative to the number of resources inventoried therein. Consequently, obtaining and maintaining information describing relationships between resources in a datacenter can be extremely labor-intensive and error-prone, which typically results in configuration management database repositories lacking trust within the information technology community. For example, many organizations have expressed skepticism that dependencies and other relationships between resources in network datacenters can be suitably mapped without harming or degrading performance within the datacenter.

Due to these and other challenges, many of which relate to modeling dependencies between resources in information technology datacenters, developing techniques to improve trust in configuration management database technology, remains an important factor in their successful adoption. However, although some technologies have shown the potential to create dependency mappings, existing systems have fallen short in actually making such dependency mappings commonplace in the information technology industry. For example, passive network scanners have been proposed as a technology that can model resources and dependencies in information technology datacenters, but passive network scanners typically require dedicated and hardwired connections to switch equipment deployed within the datacenter. Therefore, existing efforts to model resources and dependencies with passive network scanners often suffer from drawbacks relating to the expense and difficulty associated with rewiring network equipment to communicate with the passive network scanners (e.g., due to organizational, regulatory, or other reasons). In another example, modeling resources and dependencies in information technology datacenters has been attempted with technology that installs agents on every resource in the datacenter. Despite having the potential to model dependencies among the resources in the datacenter, installing agents on each and every resource can introduce intensive labor requirements and resource expenses, which has interfered with the suitability of mass-adoption for this approach to datacenter modeling.

Further still, other attempts to model dependencies between information technology resources include technologies that periodically probe every resource in the datacenter (e.g., sending the resources specific operating system commands designed to elicit responses about TCP/IP dependencies known to the resources). Although these probing techniques also have the potential to model dependencies between the datacenter resources, probing technologies typically suffer from coverage gaps due to intervals between the times when the polling or probing occurs. In other words, a resource dependency model created with periodic probing technologies would only be valid at a particular point in time (i.e., when the probe occurs), and moreover, would immediately become stale due to the inability to reflect any changes to the dependencies that arise subsequent to a particular probe (i.e., another probe would be required to update the dependency model in view of the subsequent changes). As such, despite many efforts in the information technology industry that focus on the constant search for newer and better techniques to map interdependencies between resources in network datacenters, the efforts that the industry has undertaken to date suffer from various drawbacks that interfere with successful mass adoption for configuration management databases.

Another topic that presents an important concern relating to datacenter management relates to suitably detecting security threats within the datacenter. Although various systems have been developed in the domain of network security and intrusion detection, such as tools built around Network Behavior Analysis (NBA) technology, the existing systems typically warehouse information relating to network flows and other activity within the datacenter for forensic (i.e., after-the-fact) analysis. As such, the techniques used in existing security and intrusion detection systems typically require large data warehouses to maintain archives that describe each and every flow reported in the datacenter. However, although existing systems typically maintain large amounts of information that can permit mining for interesting behavior or activity in the datacenter, the usefulness that these existing systems provide tends to be limited to detecting rogue or malicious activity post-mortem. In other words, because systems for detecting security threats that have been developed to date tend to be geared towards supporting user queries and ad-hoc analysis, existing systems often fall short in their ability to monitor activity within a datacenter to detect security threats or rogue behavior in real-time.

Moreover, yet another issue that often imposes difficulties on datacenter management includes assessing the scope and impact that may result from a considered set of proposed changes to information technology resources in the datacenter (e.g., servers, applications, hardware, etc.). The processes typically used to allow participants to understand the full scope of a set of changes can often be difficult, time-consuming, and error-prone, especially in large datacenters that have large numbers of information technology resources. Furthermore, in most (if not all) cases, no single person within an information technology organization knows every function and purpose that the information technology resources serve in the datacenter. Although configuration management databases have been used in various existing systems to support browsing and navigating relationships between information technology resources, the existing systems tend to employ ad-hoc techniques that fall short in their ability to quickly and accurately assess the scope, impact, and potential conflicts that the proposed changes may have in the datacenter. Thus, because efficiency and agility are among the most important concerns to managing modern information technology datacenters, existing systems suffer from various drawbacks in automating datacenter changes, including collaborative decision support among human participants to resolve potential problems with proposed changes.

SUMMARY OF THE INVENTION

According to one aspect of the invention, the system and method described herein may be used to create a configuration management database in a network datacenter, wherein the configuration management database may model interdependencies, detect real-time security threats, and manage proposed changes in the network datacenter. In particular, the system and method described herein may obtain accurate and timely information describing relationships and interdependencies in the datacenter, which may be modeled in a dependency database. As such, the information modeling the relationships and interdependencies in the dependency database may be used to seed the configuration management database. Further, the system and method described herein may employ Netflow or other network protocols that can suitably collect information relating to network traffic in the datacenter in a lightweight and non-impacting manner, which may achieve the desired end result of seeding the configuration management database with information describing various resources in the datacenter and relationships and interdependencies between the resources without consuming or needlessly risking impact on the operations performed by the resources in the datacenter.

According to one aspect of the invention, the system and method described herein may deliberately sample or selectively extract certain portions of information from various available network flows that traverse the datacenter. The deliberate sampling or selective extraction techniques may deliberately damper or reduce impacts on operations in the datacenter, as a number of flows needed to build a dependency map for the resources contained therein may be deliberately dampered. For example, any particular connection or "conversation" between network resources in the datacenter may be observed, wherein the observed connection or "conversation" may generally include two flows (i.e., one directed from an originating resource to a destination resource and another directed from the destination resource to the originating resource). As such, because the deliberately sampled mode may intentionally damper the number of observed flows needed to build the dependency map, the system and method may include various components that can distinguish which one of the resources originated the connection to thereby model a directional dependency between the originating resource and the destination resource. Thus, the deliberate sampling techniques may lessen impact on the datacenter without compromising the ability to model the relationships and dependencies between the resources therein to optimally balance effectiveness and practicality.

According to one aspect of the invention, the system and method described herein may create a dependency map modeling any suitable relationships or interdependencies between resources in the datacenter and store the dependency map in a configuration management database. In particular, one or more listeners may observe network flows that occur in the datacenter using information describing network conversations emitted from physical switch equipment or other communication devices in the datacenter. Thus, the listeners may receive information describing certain network conversations that occur in the datacenter, wherein the network conversation information may then be used to derive the dependency map that models the relationships or interdependencies between the resources. Furthermore, the listeners may be particularly configured to negate challenges, including expense upon resources in the datacenter and risk that the operation of the resources will be dangerously impacted due to excess bandwidth consumption, which could otherwise arise from processing every conversation that occurs in the datacenter.

According to one aspect of the invention, for example, the system and method described herein may include a discovery engine that can perform a discovery scan to baseline every listening port and/or TCP/IP resource in the datacenter. As such, the discovery engine may generally perform the discovery scan to create an inventory describing every information technology resource in the datacenter, including any open TCP/IP ports or other open communication interfaces configured to listen for network flows or other traffic in the datacenter. In one implementation, the inventory created with the discovery engine may then be stored in a resource inventory, which a dependency engine may then reference to model relationships or dependencies between the inventoried resources. In particular, using the resource inventory, the dependency engine may create and configure the listeners that accept the information describing the network flows observed in the datacenter, whereby the listeners may collect raw information describing network flows and provide the raw network flow information to the dependency engine. The dependency engine may then further analyze the raw network flow information to derive the relationships or other dependencies between the resources in the inventory and store a dependency map describing the derived relationships or other dependencies in a dependency database. For example, the listeners may generally collect only one of two flows involved in a particular connection (i.e., the flow directed from the originating resource to the destination resource). Consequently, the dependency engine 130 may determine a directionality for the raw network flows to distinguish the two resources into the originating resource and the destination resource.

According to one aspect of the invention, the system and method described herein may deliberately drop certain flows that originate from outside the datacenter and terminate inside the datacenter because such flows may represent noise or information having little or no value to modeling the relationships or dependencies within the datacenter. For example, the dependency engine may apply various rules or policies to determine directionalities for the network flows that the listeners observe, drop certain network flows that represent noise or useless information to modeling the relationships or dependencies in the datacenter, and correlate certain network flows that include information useful to modeling the relationships or dependencies within the datacenter. In particular, to determine the directionality for any particular network flow, which may generally represent a connection or conversation between two information technology resources, the network flow may be correlated with the information described in the resource inventory. In response to locating either of the two resources in the inventory, the dependency engine may determine that the located resource represents a destination for that particular flow and that the other resource represents the originator. Thus, in response to locating the originating and destination resources in the inventory, the dependency engine may model a dependency between the originating resource and the destination resource in the dependency database.

According to one aspect of the invention, the system and method described herein may further determine that the correlated network flow originates from a resource residing outside the datacenter in response to the originating resource having a network address that falls outside a network address sub-range for the datacenter or otherwise lacking description in the inventory. Thus, in response to the network flow originating from outside the datacenter, the network flow may be dropped. Furthermore, the network flow may be dropped in response to the flow not correlating with any known information modeled in the resource inventory. In particular, in response to the flow not correlating with any of the information modeled in the resource inventory, the dependency engine may determine that the flow likely represents sporadic activity from individuals working inside the datacenter with resources located outside the datacenter (e.g., opening a web browser to a remote server). In one implementation, the dependency engine may further validate whether the listener that observed the dropped network flow has previously collected a certain quantity of useful activity (e.g., in response to the listener having previously collected information resulting in a security violation) to determine whether the listener represents a useful input gateway for collecting information directed from outside to inside the datacenter. On the other hand, in response to the listener not having collected sufficient useful information, the listener may be de-provisioned to avoid having the listener continue to observe network flows that have little or no value to managing the datacenter.

According to one aspect of the invention, in response to performing the discovery scan to create the resource inventory describing the resources in the datacenter, the configuration management database may be seeded with various configuration items describing the inventoried resources. Further, in response to detecting any new or changed relationships or other dependencies within the datacenter, the relationships or dependencies may be modeled with configuration items describing the relationships or dependencies in the configuration management database. The configuration management database may therefore include various configuration items describing every resource modeled in the resource inventory and every dependency modeled in the dependency database. The dependency engine may further dynamically update the configuration management database in response to discovering any new or changed information associated with the resources and dependencies modeled therein. Furthermore, a management infrastructure may then reference the configuration management database to provide management over the datacenter in various ways (e.g., to detect real-time security threats in the datacenter, assess the scope and impact proposed changes may have in the datacenter, and manage conflicts that the proposed changes may have in the datacenter.

According to one aspect of the invention, the system and method described herein may be used to detect real-time security threats in the datacenter. In particular, the real-time security alerts may be generated in response to detecting any new or previously unknown services in the datacenter, in response to any known services initiating or otherwise performing new or previously unknown activity, or various combinations thereof. For example, various listeners may observe activity streams describing network traffic that occurs in the datacenter, wherein the activity streams may be compared to information that describes known service endpoints in the datacenter. Thus, known service endpoints in the datacenter may be mapped to populate a configuration management database, wherein the known service endpoints may provide a baseline describing a steady-state (or normal state) for the datacenter. For example, open communication ports in the datacenter may be scanned to identify running or installed services to derive an accurate and up-to-date feed describing the known service endpoints in the datacenter. Furthermore, a datacenter flow and rule engine (alternatively referred to as a "correlation engine" or "rule engine") may apply various tunable heuristics and rules to analyze the network activity, wherein the tunable heuristics and rules may define conditions or criteria for determining whether certain activity may potentially be malicious, unauthorized, rogue, or otherwise suspicious. The datacenter flow and rule engine may therefore apply the tunable heuristics and rules to detect whether any of the activity streams describe new service activity (e.g., a service initiating or beginning new activity).

According to one aspect of the invention, any new service activity may then be correlated with the known service endpoints to determine whether the activity streams represent known or unknown activity. In response to a non-intersection between any of the new service activity and the known service endpoints, the new service activity may be deemed to represent a potential security threat and a real-time security alert may be generated to report any network flows or other conversations associated with the new service activity. As such, in response to generating the security alert describing the unexpected traffic, the unexpected flows or network conversations may be reported for remediation to one or more automated security systems, management personnel, or other entities having responsibility for managing the datacenter (e.g., a security remediation event processor, a security event information management (SIEM) system, etc.). Additionally, in response to suitably completing the remediation for the security alert, the heuristics and rules may be tuned based on an outcome from such remediation. As such, the configuration management database may be updated to include information describing the outcome from such remediation, any new or otherwise tuned heuristics or rules created in response to such remediation, or any other suitable information that can be used to correlate subsequent activity that occurs in the datacenter with the known service endpoint mapping maintained in the configuration management database.

According to one aspect of the invention, the system and method described herein may further be used to assess the scope and impact that proposed changes may have in a network datacenter. In particular, various configuration items and relationships between the configuration items may be stored in a configuration management database, which may therefore provide a navigational structure that can be used to automatically assess and report on proposed changes to the datacenter. In particular, a datacenter change request may generally propose any suitable set of changes to the datacenter, wherein the change request may to remedy an information technology resource experiencing degraded performance, failure, or another situation that prompted the proposed changes. In response to deriving the proposed changes, one or more human participants required to authorize, agree, or otherwise approve the proposed changes may be identified. In one implementation, the change request may then be further analyzed to generate decision support information that may be referenced to determine whether the proposed changes are agreeable or otherwise appropriate, wherein the decision support information may include an assessment of the proposed changes that provides the human participants with sufficient information to decide whether the proposed changes can suitably proceed. For example, the change request may be analyzed to identify a set of one or more configuration items that the proposed changes will newly add, modify, or change in the configuration management database. The configuration management database may then be queried to produce a navigational traversal from the identified set of configuration items, wherein the configuration management database may analyze any relationships defined for the configuration items and create a graph data structure that represents the navigational traversal produced from the identified configuration items and any relationships that may be defined for the identified configuration items. The navigational traversal may then be combined with various domain-specific inclusions and/or exclusions, which may modify the navigational traversal to remove "noise" or other information that may not be necessary to determine whether or not to authorize or otherwise approve the proposed changes. Thus, the navigational traversal may generally represent a set of navigation pathways that emanate from a start of the navigational traversal to any endpoints that the proposed changes may impact.

In one implementation, the navigation pathways derived from the navigational traversal may then be further analyzed to filter the endpoints that the proposed changes potentially impact. Thus, the filtered set of potentially impacted endpoints may represent an initial assessment of the scope of the potential impacts that the proposed changes may have in the datacenter. In one implementation, in response to determining that the potentially impacted endpoints include no essential or otherwise critical resources, the change request may be readied and queued for automatic execution (i.e., without any human intervention). In addition, the impact analysis that resulted in automating the change request may be reported to provide decision support data that corroborates the decision to permit non-human automation. On the other hand, in response to the potentially impacted endpoints including one or more essential or critical resources, the human participants required to authorize or approve the proposed changes may be identified and a change remediation workflow among the identified human participants may be managed to resolve the potential impacts.

According to one aspect of the invention, the system and method described herein may further be used to detect and resolve conflicts that proposed changes may have in the datacenter. In particular, multiple proposed changes may be queued and readied for later execution once any potential impacts on essential or otherwise critical resources have been resolved. For example, one or more of the proposed changes may be queued for execution during off-hours or planned maintenance periods to avoid the potential impacts. Thus, even though multiple different change requests may seem unrelated, potential conflicts may nonetheless arise depending on how the multiple change requests have been queued for execution. As such, the navigation pathways produced for assessing the potential impacts from the multiple change requests may be analyzed to determine whether the multiple change requests have any potential conflicts (e.g., where one request includes a change to a particular resource scheduled during weekend maintenance and another request includes a change to a related resource scheduled during the same maintenance period). Accordingly, in response to detecting potential conflicts between multiple change requests, an event may be triggered to stop the potentially conflicting changes from proceeding through automated execution and notify human change personnel in a remediation workflow that an adjustment to resolve the potential conflicts must be made. Furthermore, the conflict analysis and other any processes involved in the change remediation workflow (including any impact analysis) may be reported to provide decision support data that corroborates any decisions to automate the change requests, resolve the potential conflicts, or otherwise manage potential conflicts from the multiple proposed changes.

Other objects and advantages of the invention will be apparent to those skilled in the art based on the following drawings and detailed description.

DETAILED DESCRIPTION

Figure 1:
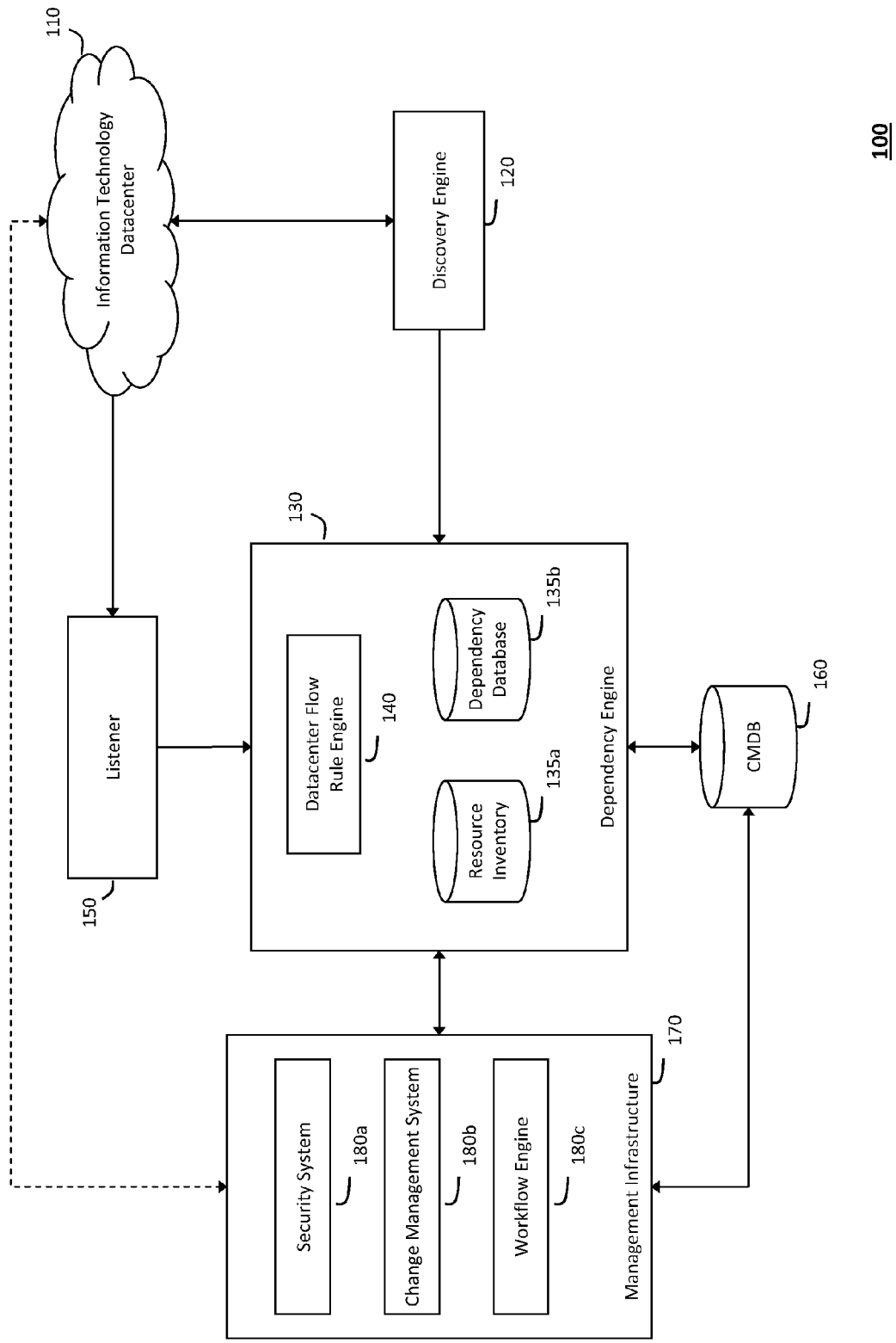
FIG. 1 illustrates an exemplary system for creating a configuration management database that can be used to model interdependencies, detect real-time security threats, and manage proposed changes in a network datacenter, according to one aspect of the invention.

According to one aspect of the invention, FIG. 1 illustrates an exemplary system 100 for creating a configuration management database 160 in a network datacenter 110, wherein the configuration management database 160 created with the techniques described herein may be used to model interdependencies, detect real-time security threats, and manage proposed changes in the network datacenter 110. In particular, the system 100 shown in FIG. 1 and described herein may obtain accurate and timely information describing relationships and interdependencies in the datacenter 110, which may then be stored in a dependency database 135*b* containing information describing such relationships and interdependencies. As such, the information describing the relationships and interdependencies in the dependency database 135*b* may be used to seed the configuration management database 160. For example, in one implementation, the system 100 may employ Netflow or various other network protocols that can suitably collect information relating to network traffic in the datacenter 110 in a lightweight and non-impacting manner, which may achieve the desired end result of seeding the configuration management database 160 with information describing various information technology resources in the datacenter 110 and relationships and interdependencies between the resources without consuming or needlessly risking impact on the operations performed by the resources in the datacenter 110.

In particular, the system 100 shown in FIG. 1 and described herein may deliberately sample or selectively extract certain portions of information from various available network flows that traverse the datacenter 110. As such, the deliberate sampling or selective extraction techniques may deliberately damper or reduce impacts on operations in the datacenter 110 because a number of flows needed to build a dependency map for the resources contained therein may be deliberately dampered. For example, as noted above, the system 100 may employ Netflow or other suitable network protocols that can observe any particular connection or "conversation" between network resources in the datacenter 110, wherein the observed connection or "conversation" may generally include two flows (i.e., one flow directed from an originating resource to a destination resource, and another flow directed from the destination resource to the originating resource). As such, because the system 100 generally operates in a deliberately sampled mode that intentionally dampers the number of flows observed to build the dependency map, the system 100 may include various components that can distinguish which one of the resources originated the connection or conversation and thereby model a directional dependency between the originating resource and the destination resource. Thus, the deliberate sampling techniques described in further detail herein may lessen impact on the datacenter 110 without compromising the ability to model the relationships and dependencies between the resources therein, whereby the configuration management database 160 may be created with techniques that optimally balance effectiveness and practicality. However, Netflow could be suitably replaced with any other protocol, system, or application that can generate a raw set of feeds describing network flows from a particular source in the datacenter 110 (e.g., requests to authenticate users, run commands, send information, etc.). For example, the system 100 may include one or more active scanners that can probe the resources in the datacenter 110 or communicate with one or more agents installed on the resources in the datacenter 110, but the selective sampling techniques that leverage Netflow, as described herein, may have advantages in providing a lightweight approach to modeling dependencies in the datacenter 110.

In one implementation, as noted above, the system 100 may create a dependency map modeling any suitable relationships or interdependencies between resources in the datacenter 110, wherein the dependency map modeling the relationships or interdependencies between the resources may be stored in a configuration management database 160. In particular, one or more listeners 150 may be configured to use Netflow or another suitable network protocol that can observe network flows that occur in the datacenter 110. For example, physical switch equipment or other suitable communication devices in the datacenter 110 may generally use Netflow or the other network protocols to emit information describing network conversations between information technology resources in the datacenter 110, wherein the information describing the network conversations may be emitted to the listeners 150. Thus, the listeners 150 may generally receive information describing certain network conversations that occur in the datacenter 110 (i.e., from the physical switch equipment or other communication devices), wherein the network conversation information may then be used to derive the dependency map that models the relationships or interdependencies between the resources. Furthermore, as described in further detail herein, the listeners 150 may be particularly configured to negate challenges that may arise from processing every conversation that occurs in the datacenter 110 (e.g., expending storage, processing, and other resources, potentially risking dangerous impacts on the operation of the resources due to excess bandwidth consumption, etc.).

For example, in one implementation, the system 100 may include a discovery engine 120 configured to perform a discovery scan that baselines (i.e., identifies) every listening port and/or TCP/IP resource in the datacenter 110. In one implementation, the discovery engine 120 may include any suitable port-scanning system or application that can identify the listening ports and/or TCP/IP resources in the datacenter (e.g., an open source nmap security scanning system or application, an Angry IP Scanner, etc.). As such, the discovery engine 120 may generally perform the discovery scan to create an inventory describing every information technology resource in the datacenter 110, wherein the inventory may generally list any open TCP/IP ports or other open communication interfaces configured to listen for network flows or other traffic on the various information technology resources described in the inventory. In one implementation, the inventory created with the discovery engine 120 may then be stored in a resource inventory 135a, which a dependency engine 130 may then reference to map relationships or dependencies between the resources inventoried therein. In particular, using the list of the open TCP/IP ports or other open communication interfaces on the resources described in the resource inventory 135a, the dependency engine 130 may create and configure the one or more listeners 150 to accept information describing network flows that occur in the datacenter 110 (e.g., the physical network switch equipment may be modified or otherwise configured to direct information describing any network flows that traverse the switch equipment to the listeners 150).

As such, in one implementation, the listeners 150 may generally collect raw information describing the network flows emitted from the physical network switch equipment or other communication devices and provide the raw network flow information to the dependency engine 130. In one implementation, the dependency engine 130 may then further analyze the raw network flow information provided from the listeners 150 to derive relationships or other interdependencies between the resources described in the resource inventory 135a, wherein the dependency engine 130 may store a dependency map describing the derived relationships or other interdependencies in a dependency database 135b. For example, the listeners 150 may be configured as destination listeners that only collect one of two flows involved in a particular connection or conversation between two resources (i.e., the flow directed from the originating resource to the destination resource). Consequently, the dependency engine 130 may determine a directionality for the raw network flows to distinguish the two resources into the originating resource and the destination resource. Further, because many flows that originate outside the datacenter 110 and terminate inside the datacenter 110 may represent noise or information that may have little or no value to modeling relationships or interdependencies within the datacenter 110, the dependency engine 130 may deliberately drop certain flows that originate from outside the datacenter 110.

For example, in one implementation, the dependency engine 130 may include a datacenter flow and rule engine 140 (alternatively referred to as a "correlation engine" or "rule engine"), which may be configured to apply one or more rules or policies to determine directionalities for the network flows that the listeners 150 observe and report to the dependency engine 130, drop certain network flows reported from the listeners 150 that represent noise or useless information to modeling the relationships or interdependencies within the datacenter 110, and correlate certain network flows reported from the listeners 150 that include information useful to modeling the relationships or interdependencies within the datacenter 110, among other things. In particular, to determine the directionality for any particular network flow reported from the listeners 150, which may generally represent a connection or conversation between two information technology resources, the datacenter flow and rule engine 140 may correlate the network flow with the open TCP/IP ports or other communication interfaces identified in the discovery scan and described in the resource inventory 135a. In response to locating either of the two information technology resources in the resource inventory 135a, the datacenter flow and rule engine 140 may determine that the located resource represents a destination for that particular flow and that the other resource represents the originator for that particular flow (i.e., because the listeners 150 may be configured to only collect the flow in the conversation directed from the originating resource to the destination resource). Thus, in response to locating the originating resource and the destination resource in the resource inventory 135a, the datacenter flow and rule engine 140 may model a dependency between the originating resource and the destination resource in the dependency database 135b.

Furthermore, in one implementation, the datacenter flow and rule engine 140 may determine that the correlated network flow originates from a resource that resides outside the datacenter 110 in response to the originating resource having a network address that falls outside a network address sub-range (e.g., a TCP/IP sub-range) for the datacenter 110 or in response to the resource inventory 135a otherwise lacking information describing the resource. Thus, in response to the correlated network flow originating from outside the datacenter 110, the datacenter flow and rule engine 140 may drop the network flow. In addition, the network flow may be dropped in response to the datacenter flow and rule engine 140 determining that the flow does not correlate with any known TCP/IP ports, communication interfaces, or other resources described in the resource inventory 135a. In particular, in response to the flow not correlating with any of the information modeled in the resource inventory 135a, the datacenter flow and rule engine 140 may determine that the flow likely represents sporadic activity from individuals working on resources inside the datacenter 110 to resources outside the datacenter 110 (e.g., opening a web browser to access a remote web server). In one implementation, however, the datacenter flow and rule engine 140 may further validate whether the listener 150 that observed the dropped network flow has previously collected a certain quantity of useful activity. For example, in response to the listener 150 that observed the dropped network flow having previously collected information that resulted in detecting security violations, the datacenter flow and rule engine 140 may determine that the listener 150 represents a useful input gateway from outside the datacenter 110 to inside the datacenter 110, whereby the listener 150 may continue to observe network flows that can be used to manage the datacenter 110 in other ways. On the other hand, in response to the listener 150 not having collected sufficient useful information, the datacenter flow and rule engine 140 may de-provision the listener 150 to avoid having the listener 150 continue to report network flows that have little or no value to management within the datacenter 110.

Thus, in response to performing the discovery scan to create the resource inventory 135a describing every resource in the datacenter 110, the dependency engine 130 may seed the configuration management database 160 with various configuration items describing the resources inventoried within the resource inventory 135a. Further, in response to modeling any relationships or other interdependencies between resources within the datacenter 110, the dependency engine 130 may represent the dependency within the dependency database 135b and produce a configuration item describing the dependency in the configuration management database 160. Accordingly, the configuration management database 160 may generally include various configuration items describing every resource in the datacenter mapping modeled in the resource inventory 135a and every relationship or other dependency in the dependency mapping modeled in the dependency database 135b. In one implementation, the configuration management database 160 may therefore be dynamically updated in response to subsequently discovering any new or changed information associated with the resources and dependencies modeled with the configuration items stored in the configuration management database 160, wherein a management infrastructure 170 may then reference the configuration management database 160 to provide management over the datacenter 110 in various ways (e.g., via the dashed line in FIG. 1 connecting the management infrastructure 170 to the information technology datacenter 110). For example, as will be described in further detail below, the configuration items stored in the configuration management database 160 may be referenced by a security system 180a, a change management system 180b, and/or a workflow engine 185c to detect real-time security threats in the datacenter 110 (e.g., FIG. 3), assess the scope and impact that proposed changes may have in the datacenter 110 (e.g., FIG. 4A), and detect and resolve conflicts that the proposed changes may have in the datacenter 110 (e.g., FIG. 4B).

Figure 2:
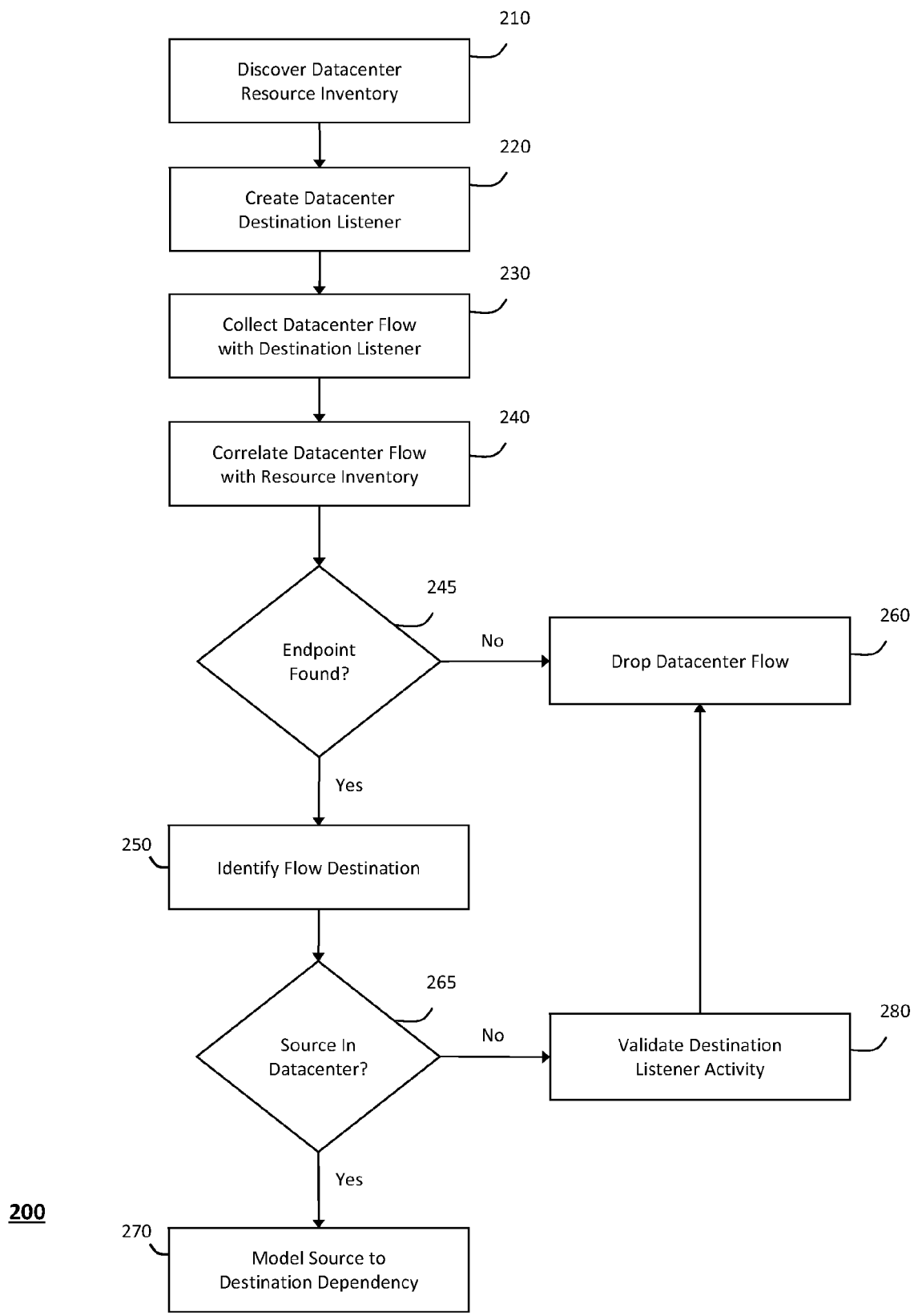
FIG. 2 illustrates an exemplary method for modeling interdependencies in a network datacenter, according to one aspect of the invention.

According to one aspect of the invention, FIG. 2 illustrates an exemplary method 200 for modeling interdependencies in a network datacenter. In particular, the method 200 shown in FIG. 2 and described herein may generally operate in and provide substantially similar functionality to the system 100 shown in FIG. 1 and described in further detail above. For example, in one implementation, the method 200 may create a configuration management database that can be used to model interdependencies, detect real-time security threats, and manage proposed changes in a network datacenter.

For example, in one implementation, an operation 210 may include a discovery engine that performs a discovery scan to discover (i.e., baseline or otherwise identify) every listening port and/or TCP/IP resource in the datacenter. In one implementation, as noted above, the discovery engine may include any suitable port-scanning system or application that can identify the listening ports and/or TCP/IP resources in the datacenter (e.g., an open source nmap security scanning system or application, an Angry IP Scanner, etc.). As such, the discovery engine may generally perform the discovery scan to discover an inventory describing every resource in the datacenter, wherein the inventory may generally list any open TCP/IP ports or other open communication interfaces configured to listen for network flows or other traffic on the various described therein. In one implementation, the inventory created with the discovery engine may then be stored in a resource inventory, which a dependency engine may then reference to map relationships or dependencies between the resources inventoried therein.

In particular, using the list of the open TCP/IP ports or other open communication interfaces on the resources described in the resource inventory, an operation 220 may include the dependency engine creating and configuring one or more listeners to accept information describing network flows that occur in the datacenter (e.g., the physical network switch equipment may be modified or otherwise configured to direct information describing any network flows that traverse the switch equipment to the listeners). As such, the listeners may generally collect raw information describing the network flows emitted from the physical network switch equipment or other communication devices in an operation 230, wherein the listeners may then provide the raw network flow information to the dependency engine. In one implementation, the dependency engine may then further correlate the raw network flow information provided from the listeners in an operation 240 to derive relationships or other interdependencies between the resources described in the resource inventory, wherein the dependency engine may store a dependency map describing the derived relationships or other interdependencies in a dependency database. For example, the listeners may be configured as destination listeners that only collect one of two flows involved in a particular connection or conversation between two resources (i.e., the flow directed from the originating resource to the destination resource).

In one implementation, the dependency engine may correlate the network flows with the resource inventory in operation 240 to determine a directionality for the raw network flows. In particular, the dependency engine may apply one or more rules or policies in an operation 245 to determine the directionality for the raw network flows and distinguish the two resources involved in the flow into an originating resource and a destination resource. For example, to determine the directionality for any particular network flow reported from the listeners, which generally represent a connection or conversation between two information technology resources, operation 240 may include correlating the network flow with the open TCP/IP ports or other communication interfaces described in the resource inventory. In response to locating either of the two resources in the resource inventory in operation 245, the dependency engine may determine that the located resource represents a destination (or endpoint) for that particular flow in an operation 250. In addition, the dependency engine may further determine that the other resource represents the originator for that particular flow (i.e., because the listeners only collect the flow directed from the originating resource to the destination resource). As such, in response to an operation 265 determining that the originating resource and the destination resource have been located in the resource inventory, an operation 270 may include modeling a dependency between the originating resource and the destination resource.

Alternatively, operation 245 may include determining that that the flow does not correlate with any known TCP/IP ports, communication interfaces, or other resources described in the inventory. In particular, in response to the flow not correlating with any of the information modeled in the resource inventory, the flow likely represents sporadic activity from individuals working inside the datacenter with resources outside the datacenter. Thus, the network flow may be similarly dropped in operation 260 in response to the flow not correlating with any of the information described in the resource inventory. Additionally, operation 265 may include determining that the correlated network flow originates from a resource residing outside the datacenter in response to the flow originating from a resource having a network address that falls outside a sub-range for the datacenter or otherwise lacking description in the inventory. Thus, in response to the correlated network flow originating from outside the datacenter, the network flow may be similarly dropped in operation 260. However, in one implementation, an operation 280 may further include validating whether the listener that observed the dropped network flow previously collected a certain quantity of useful activity (e.g., in response to the listener having previously collected information resulting in a security violation). As such, operation 280 may include validating whether the listener represents a useful input gateway from outside the datacenter to inside the datacenter, whereby the listener may continue to observe network flows that can be used to manage the datacenter in other ways. On the other hand, in response to the listener not having collected sufficient useful information, the listener may be de-provisioned to avoid having the listener continue to observe flows that have little or no value to managing the datacenter.

Thus, in response to performing the discovery scan to inventory every resource in the datacenter, the configuration management database may be seeded with various configuration items describing the inventoried resources. Further, in response to modeling any relationships or other dependencies discovered between the resources in the datacenter, configuration items corresponding to the discovered relationships or other dependencies may be stored in the configuration management database. As such, the configuration management database may generally include various configuration items describing every resource and relationship or other dependency in the datacenter. Furthermore, in one implementation, the configuration management database may be dynamically updated in response to subsequently discovering any new or changed relationships or dependencies in the datacenter (e.g., according to the techniques described above in connection with the method shown in FIG. 2). In one implementation, as will be described in greater detail below, a management infrastructure may then reference the configuration management database to manage the datacenter in various ways (e.g., to detect real-time security threats, assess the scope and potential impact from proposed changes, and detect and resolve potential conflicts from the proposed changes, etc.).

Figure 3:
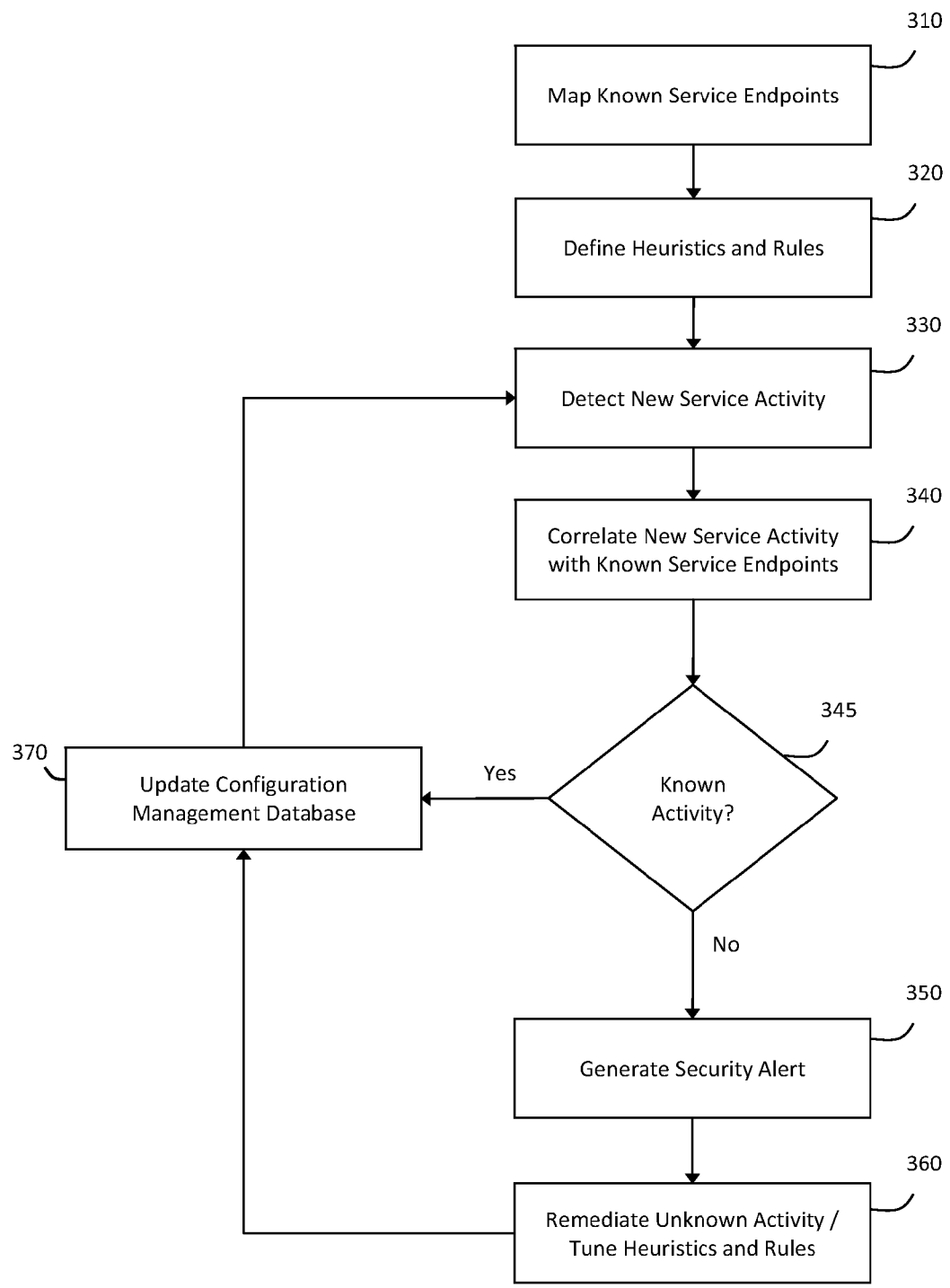
FIG. 3 illustrates an exemplary method for detecting real-time security threats in a network datacenter, according to one aspect of the invention.

According to one aspect of the invention, FIG. 3 illustrates an exemplary method 300 for detecting real-time security threats in a network datacenter. In particular, the method 300 shown in FIG. 3 and described herein may provide various features that can be used to detect security threats within the network datacenter in real-time, and further to generate real-time alerts in response to detecting the real-time security threats in the datacenter. As used herein, detecting the security threats in "real-time" may generally refer to discovering or otherwise identifying potentially malicious, unauthorized, or otherwise rogue activity in the datacenter substantially simultaneously or close in time with respect to when such activity occurs, while generating the security alerts in "real-time" may similarly refer to creating events, alarms, warnings, or other notifications describing the potentially rogue activity substantially simultaneously or close in time with respect to when such activity has been detected.

For example, in one implementation, the method 300 shown in FIG. 3 and described herein may generally issue the real-time security alerts in response to detecting any new or previously unknown services in the datacenter, in response to any known services initiating or otherwise performing new or previously unknown activity, or various combinations thereof. In particular, various listeners may use Netflow or another network protocol to observe activity streams describing network traffic that occurs in the datacenter in a similar manner as described above in connection with FIGS. 1 and 2. In one implementation, the activity streams may then be compared to information stored in a configuration management database that describes known service endpoints in the datacenter. For example, as described in further detail above, network switches, routers, and other communication devices in the datacenter may implement technologies based on Netflow or other network protocols that can observe network activity, whereby the network switches, routers, and other communication devices may report any and all network conversations to a targeted listener (e.g., the communication device may report any TCP/IP or other network conversations that interact with a particular service operating on the communication device to a targeted listener that has been configured to collect information describing network conversations that involve the particular service).

Thus, in one implementation, an operation 310 may generally include mapping known service endpoints in the datacenter and populating a configuration management database with the known service endpoints, wherein populating the configuration management database with the known service endpoints may provide information that can be referenced to generate real-time security alerts in response to detecting that any new services have been installed in the datacenter. In particular, viruses and other malware commonly install service endpoints within a targeted datacenter (e.g., Trojan Horses) prior to initiating activity that uses such service endpoints to infect servers and other resources in the targeted datacenter. As such, mapping the known service endpoints in operation 310 may provide a baseline describing a steady-state (or known safe state) for the datacenter. For example, in one implementation, operation 310 may include scanning open communication ports in the datacenter to identify services running or installed on the open communication ports (e.g., with open source nmap security scanning systems or applications, Angry IP Scanners, etc.). Further, in one implementation, operation 310 may be performed periodically, continuously, or at other suitable times (e.g., in response to one or more conditions satisfying a policy that results in triggering the operation 310 to map the known service endpoints). Accordingly, operation 310 may generally provide an accurate and up-to-date feed to the configuration management database that maintains the baseline (or steady-state) describing the known service endpoints in the datacenter.

In one implementation, in response to operation 310 populating the configuration management database with the known service endpoints mapped in the datacenter, an operation 320 may include defining various tunable heuristics and rules that a datacenter flow and rule engine (alternatively referred to as a "correlation engine" or "rule engine") may apply to analyze network activity that occurs in the datacenter. In one implementation, the tunable heuristics and rules may generally define various conditions or criteria for determining whether certain activity that occurs in the datacenter may potentially be malicious, unauthorized, rogue, or otherwise suspicious. For example, as noted above, various targeted listeners may use Netflow or another suitable network protocol to observe network traffic that occurs in the datacenter, wherein activity streams describing the observed network traffic may be provided from the targeted listeners to the datacenter flow and rule engine (e.g., communication devices in the datacenter may report TCP/IP or other network conversations that interact with a particular service to a targeted listener specifically configured to observe network conversations that involve that service).

In one implementation, an operation 330 may then include the datacenter flow and rule engine applying the tunable heuristics and rules to the activity streams provided from the targeted listeners to detect whether any of the activity streams describe new service activity. For example, the datacenter flow and rule engine may detect the new service activity in response to any of the activity streams describing a service initiating activity in the datacenter. In one implementation, in response to detecting the new service activity, an operation 340 may then include the datacenter flow and rule engine correlating the new service activity with the known service endpoints mapped within the configuration management database. As such, operation 340 may generally include comparing the activity streams provided from the targeted listeners to the baseline or steady-state for the datacenter currently maintained in the configuration management database. In one implementation, the datacenter flow and rule engine may then determine whether any of the activity streams provided from the targeted listeners represents known or unknown activity in an operation 345. In response to an intersection between the new service activity observed by the targeted listeners and the known service endpoints mapped in the configuration management database, the datacenter flow and rule engine may determine that the new service activity does not represent a potential security threat (e.g., because a valid resource initiated the new service activity during an interval between different service endpoint mappings performed in operation 310). Accordingly, in one implementation, an operation 370 may include updating the configuration management database with information describing the new service activity in response to detecting the intersection between the new service activity and the known service endpoint mapping (e.g., to avoid generating false positives for similar subsequent activity, wasting resources on processing new activity deemed to not represent a security threat, etc.).

On the other hand, in response to a non-intersection between any of the new service activity observed by the targeted listeners and the known service endpoints mapped in the configuration management database, the datacenter flow and rule engine may determine that the new service activity represents a potential security threat in the datacenter. In one implementation, in response to detecting the non-intersection between the known service endpoints and the new service activity described in any particular one of the activity streams, an operation 350 may include the datacenter flow and rule engine generating a real-time security alert to report any network flows or other conversations associated with the new service activity. In one implementation, in response to detecting the non-intersection between the known service endpoints and the new service activity in operation 350, the datacenter flow and rule engine may report the flows or network conversations associated therewith because the flows or network conversations may be deemed to represent unexpected traffic falling out-of-scope from the baseline that the configuration management database maintains to describe the steady-state or normal state for the datacenter. As such, in response to generating the security alert describing the unexpected traffic, an operation 360 may include the datacenter flow and rule engine reporting the unexpected flows or network conversations for remediation to one or more automated security systems, management personnel, or other entities having responsibility for managing the datacenter.

For example, in one implementation, the security alert may be forwarded to a security remediation event processor, a security event information management (SIEM) system, or other suitable management entities, which may remediate the unknown activity in an operation 360, wherein the management entities may immediately receive the real-time security alert describing the potentially malicious, unauthorized, rogue, or otherwise suspicious activity and initiate remediation for the security alert. In one implementation, in response to the management entities receiving the security alert, the unknown or suspicious activity may be remediated using any suitable security management techniques. For example, the management entities may correlate the security alert with any other events or information associated with the datacenter to determine whether the security alert represents an actual problem or a false alarm. Furthermore, in response to determining that the security alert represents an actual problem, the management entities may isolate any resources associated with the new service activity, take action to disable the new service that initiated the unexpected activity, monitor subsequent activity associated with the new service or the isolated resources to derive knowledge relating to how malicious users may attempt to exploit the new service activity, identify other resources that the new service may impact due to dependencies with the isolated or monitored resources, or any other suitable security management technique may be employed (e.g., as described in co-pending U.S. patent application Ser. No. 12/424,428, entitled "System and Method for Auditing Governance, Risk, and Compliance Using a Pluggable Correlation Architecture," filed Apr. 15, 2009, the contents of which are hereby incorporated by reference in their entirety).

Additionally, in response to suitably completing the remediation for the security alert, operation 360 may further include tuning the heuristics and rules based on an outcome from such remediation. For example, operation 360 may include defining a new rule to identify the service that initiated the unexpected activity as a malicious process in response to determining that the activity represents rogue traffic, identify the service as an acceptable process in response to determining that the activity represents benign traffic, or otherwise define criteria or conditions that the datacenter flow and rule engine may reference to correlate subsequent activity that occurs in the datacenter with the known service endpoint mapping maintained in the configuration management database. As such, in response to suitably completing the remediation for the security alert, the configuration management database may be updated in operation 370 to include information describing the outcome from such remediation, any new or otherwise tuned heuristics or rules created in response to such remediation, or any other suitable information that can be used to correlate subsequent activity that occurs in the datacenter with the known service endpoint mapping maintained in the configuration management database.

Figure 4A:
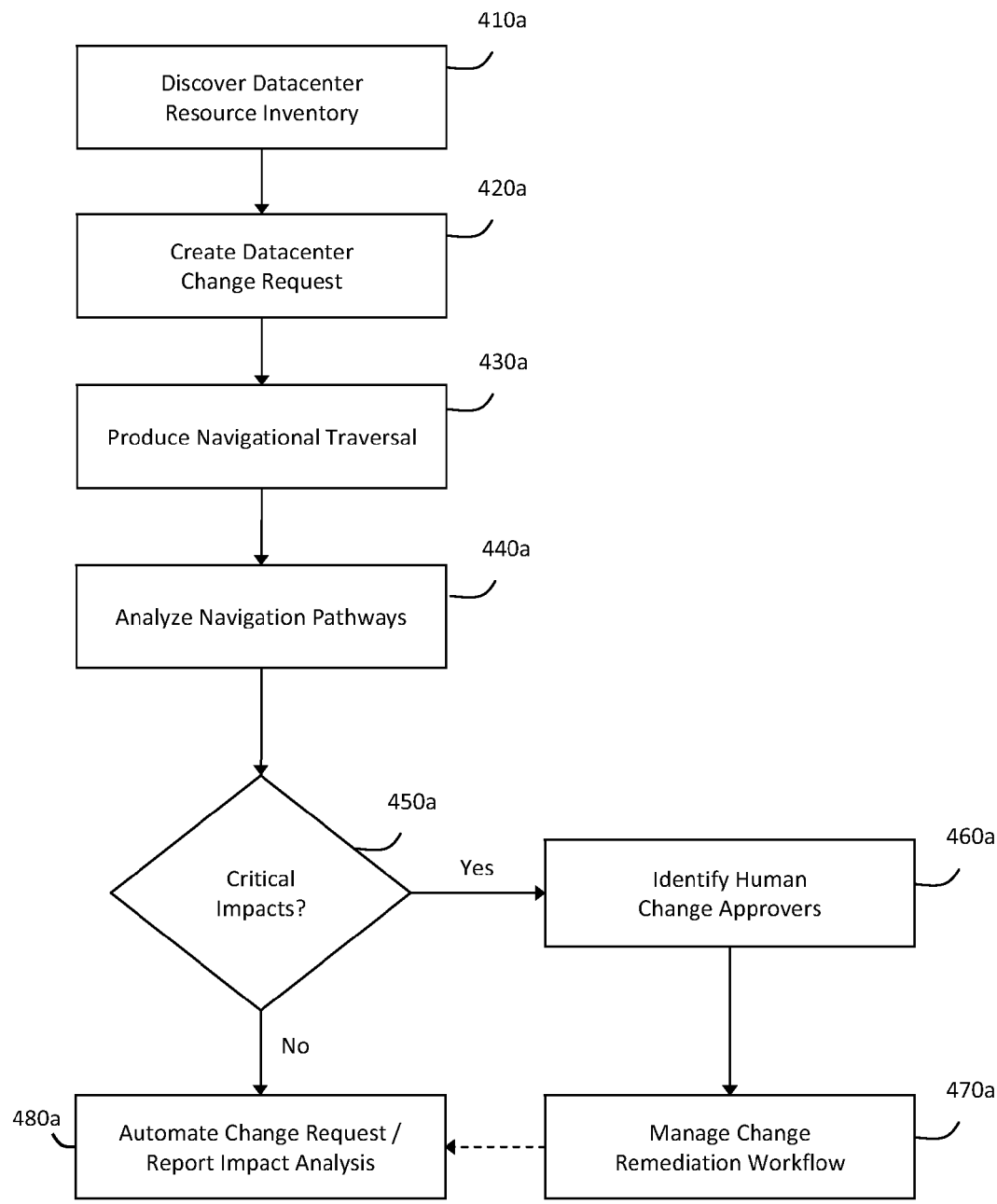
FIG. 4A illustrates an exemplary method for assessing the scope and impact that proposed changes may have in a network datacenter, according to one aspect of the invention.

According to one aspect of the invention, FIG. 4A illustrates an exemplary method 400A for assessing the scope and impact that proposed changes may have in a network datacenter. In particular, the method 400A shown in FIG. 4A and described herein may provide automated techniques to manage one or more proposed changes to the network datacenter, assess the proposed changes quickly and accurately, and drive efficiency and agility in the datacenter. For example, as will be described in further detail herein, the method 400A may perform one or more automated queries to identify any services, applications, systems, or other resources in a configuration management database that the proposed changes may impact and automatically apply one or more rules to navigate and reports results returned from in response to the automated queries.

In one implementation, the method 400A may include discovering a resource inventory within the datacenter in an operation 410a, wherein the resource inventory may be discovered with similar techniques as described in further detail above with reference to FIGS. 1 through 3, although the resource inventory may alternatively be discovered with any other suitable techniques, whether or not explicitly described. In one implementation, the resource inventory discovered in operation 410a may generally include a configuration item (CI) to represent one information technology resource, wherein the configuration item may model the represented resource to a granularity that can be useful to reporting potential impacts from proposed changes to the resource or another resource related thereto. For example, any particular configuration item may contain or be related to sub-components of an information technology resource. Further, the configuration item may use or own other configuration items in the resource inventory (e.g., a shared storage infrastructure may have a configuration item that represents a server resource, which may use or own one or more other configuration items in the shared storage infrastructure). In addition, the resource inventory may further include relationships among the configuration items stored therein, including relationships between configuration items and sub-components of the configuration items and between multiple different configuration items, among others. Thus, in addition to the configuration items describing resources in the datacenter, the resource inventory discovered in operation 410a may further include peer, dependency, or other semantic or domain-dependent relationships between the configuration items.

In one implementation, the configuration items and the relationships discovered in operation 410 may therefore provide a navigational structure that can be used to automatically assess and report on proposed changes to the datacenter. In particular, a datacenter change request may be created in an operation 420a to propose any suitable set of changes to the datacenter. For example, the change request may be created in response to a particular information technology resource experiencing degraded performance or failure, wherein the change request may include, one or more proposed changes to the existing resources in the datacenter that have been derived to remedy the degraded performance, failure, or other situation that prompted the proposed changes. In response to deriving the one or more proposed changes to the resources in the datacenter, operation 420a may further include identifying one or more human participants required to authorize, agree, or otherwise approve the proposed changes. In one implementation, as will be described in further detail herein, the change request may then be further analyzed to generate decision support information that may be referenced to determine whether the proposed changes are agreeable or otherwise appropriate, wherein the decision support information may include an assessment of the proposed changes that provides the human participants with sufficient information to decide whether the proposed changes can suitably proceed (e.g., as described in co-pending U.S. patent application Ser. No. 12/725,241, entitled "System and Method for Intelligent Workload Management," filed Mar. 16, 2010, the contents of which are hereby incorporated by reference in their entirety).

For example, in one implementation, an operation 430a may include analyzing the change request to identify a set of one or more configuration items that the proposed changes will newly add, modify, or otherwise change within the configuration management database. In response to identifying the one or more configuration items, operation 430a may further include querying the configuration management database to produce a navigational traversal. In particular, from the identified set of configuration items, the configuration management database may analyze any relationships defined for the configuration items and create a graph data structure that represents the navigational traversal produced from the identified configuration items and any relationships that may be defined for the identified configuration items. For example, in one implementation, the navigational traversal may be produced using similar techniques as described in "A Technical Overview of Novell® CMDB360™," the contents of which are hereby incorporated by reference in their entirety.

In one implementation, the navigational traversal produced from the information stored in the configuration management database may then be combined with various domain-specific inclusions and/or exclusions, which may modify the navigational traversal to remove "noise" or other information that may not be necessary to determine whether or not to authorize or otherwise approve the proposed changes (e.g., a domain-specific inclusion may be defined to include resources in remote datacenters provided by trusted partners). Thus, the navigational traversal produced in operation 430a may generally represent a set of navigation pathways that emanate from a start of the navigational traversal to any endpoints that the proposed changes may impact.

In one implementation, the navigation pathways derived from the navigational traversal may then be further analyzed in an operation 440a. In particular, the endpoints that the proposed changes potentially impact may be filtered in operation 440a using a datacenter flow and rule engine (alternatively referred to as a "correlation engine" or "rule engine") that tunes one or more heuristics, policies, or other rules to a particular implementation for the configuration management database (e.g., because a configuration management database often represents a generic construct that can be created or utilized in many different ways). Thus, analyzing the navigation pathways in operation 440a may generally include filtering the potentially impacted endpoints identified therein, wherein the filtered set of potentially impacted endpoints may represent an initial assessment of the scope of the potential impacts that the proposed changes may have in the datacenter (i.e., resources in the datacenter that may have their operations impacted due to the proposed changes). In one implementation, an operation 450a may then include determining whether any of the potential impacted endpoints include essential or otherwise critical resources. In response to determining that the potentially impacted endpoints include no essential or otherwise critical resources, an operation 480a may include automatically implementing the change request in the datacenter (i.e., without any human intervention). In addition, operation 480a may further report the impact analysis that resulted in the change request receiving approval for automated implementation. In other words, although the change request may be automatically approved and implemented in response to determining that no essential or critical resources will be impacted, the impact analysis may nonetheless be reported to provide decision support data that corroborates the decision to permit non-human automation (e.g., to provide supplemental information that can be referenced to prove compliance with any organizational or regulatory requirements, derive management knowledge for subsequent change requests having similar characteristics, provide version control or an audit trail for the datacenter over time, etc.).

On the other hand, in response to determining in operation 450a that the potentially impacted endpoints include one or more essential or critical resources, one or more human participants required to authorize or approve the proposed changes may be identified in an operation 460a. Thus, in one implementation, an operation 470a may include managing a change remediation workflow among the identified human participants to resolve the potential impacts. For example, in one implementation, the change remediation workflow may present graphical reports, multimedia, and/or other interfaces to the human participants required to authorize or approve the proposed changes (e.g., as described in co-pending U.S. patent application Ser. No. 12/725,263, entitled "System and Method for Recording Collaborative Information Technology Processes in an Intelligent Workload Management System," filed Mar. 16, 2010, the contents of which are hereby incorporated by reference in their entirety). Accordingly, the change remediation workflow managed in operation 470a may provide the human participants with sufficient information to determine whether or not to approve the proposed changes for automated implementation, where the proposed changes may be automatically implemented in operation 480a in a similar manner as described above in response to the human participants collaboratively resolving the potential impacts and authorizing or otherwise approving the proposed changes. Alternatively, in response to the human participants rejecting or otherwise determining not to authorize the proposed changes, the proposed changes may be discarded in operation 470a without further processing. However, regardless of whether the human participants authorize or reject the proposed changes, the impact analysis and other any processes involved in the change remediation workflow may be reported in operation 480a to provide the decision support data that can be audited or referenced to remediate the decision-making process that resulted in the human participants authorizing or rejecting the proposed changes.

Figure 4B:
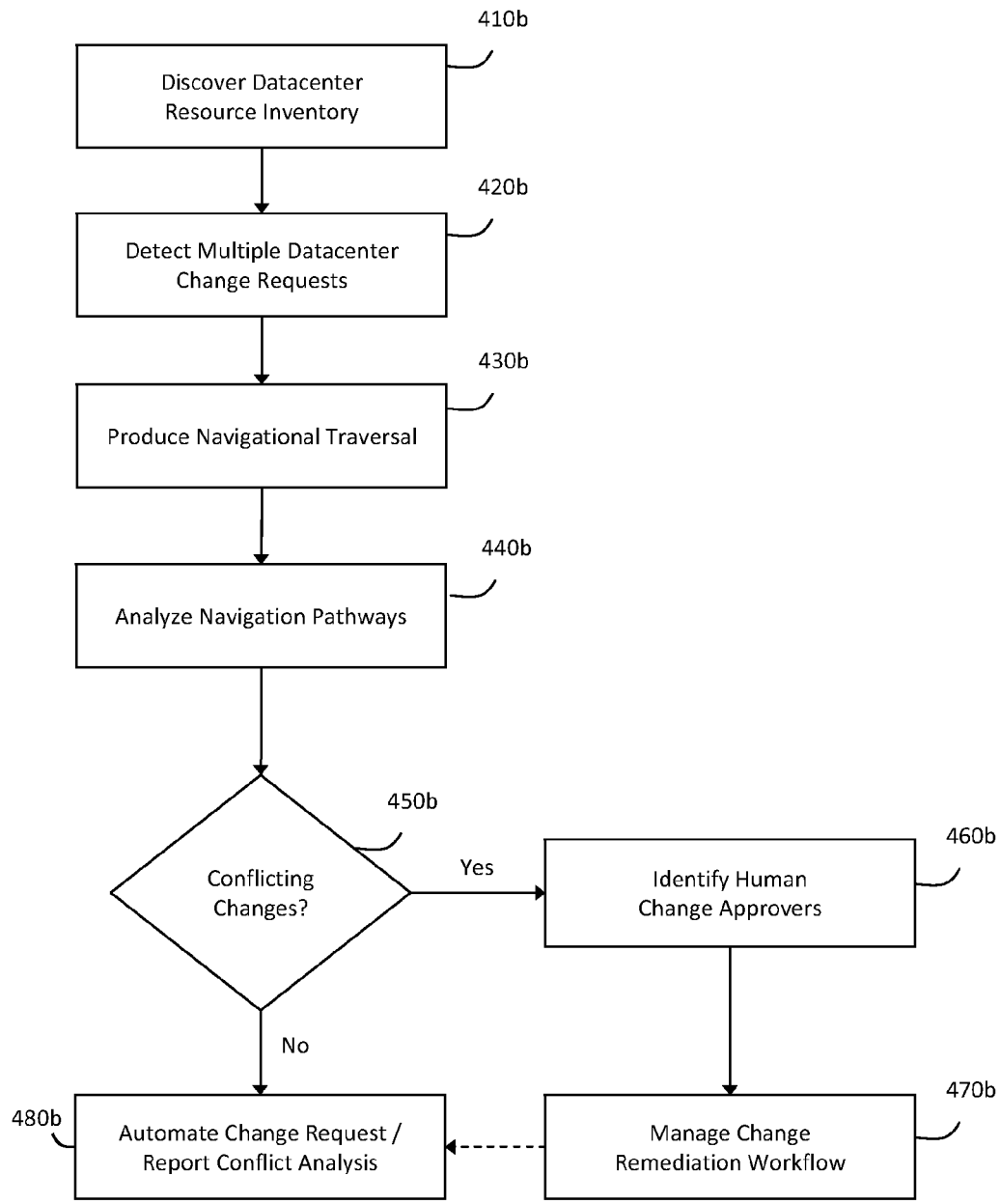
FIG. 4B illustrates an exemplary method for detecting and resolving conflicts that proposed changes may have in a network datacenter, according to one aspect of the invention.

According to one aspect of the invention, FIG. 4B illustrates an exemplary method 400B for detecting and resolving conflicts that proposed changes may have in a network datacenter. In particular, the method 400B shown in FIG. 4B and described herein may generally operate in a substantially similar manner as described with reference to FIG. 4A, except that the method 400B may be used to further detect and remediate potential conflicts between multiple sets of proposed changes to the datacenter. In particular, whereas operation 420a in FIG. 4A creates one particular datacenter change request, operation 420b in FIG. 4B may create multiple datacenter requests that include multiple different sets of proposed changes to the datacenter. In one implementation, the multiple change requests may then be analyzed using substantially similar techniques as described in connection with FIG. 4A, except that the proposed changes may be queued and readied for later execution once any potential impacts on essential or otherwise critical resources have been resolved. For example, one or more of the proposed changes may be queued for execution during off-hours or planned maintenance periods to avoid the potential impacts. Thus, even though multiple different change requests may seem unrelated, potential conflicts may nonetheless arise depending on how the multiple change requests have been queued for execution.

As such, in one implementation, an operation 440b may include analyzing the navigation pathways produced for the multiple change requests, wherein operation 450b may then include determining whether the multiple change requests have any potential conflicts (e.g., where one request includes a change to a particular resource scheduled during weekend maintenance and another request includes a change to a related resource scheduled during the same maintenance period). Thus, multiple sets of proposed changes scheduled for later execution may potentially conflict even though processes performed to assess potential impacts from the multiple sets of proposed changes may not have identified any particular intersection between the multiple change sets. Accordingly, in response to detecting one or more potential conflicts between the multiple change requests (e.g., due to natural tendencies whereby changes are often batched for execution during accepted maintenance windows), an operation 460b may trigger an event that stops the potentially conflicting changes from proceeding through automated execution and identifies human change personnel that a remediation or adjustment resolving the potential conflicts must be made, wherein a change remediation workflow among the human participants may then be managed to resolve the potential conflicts in operation 470b. On the other hand, in response to determining in operation 450b that the multiple changes do not have any potential conflicts, the multiple changes may be permitted to proceed automatically according to the defined schedules. However, in either scenario, the conflict analysis and other any processes involved in the change remediation workflow (including any impact analysis) may be reported in operation 480b to provide decision support data that corroborates the decisions in automating the change requests or otherwise resolving the potential conflicts.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system for modeling interdependencies in a network datacenter, comprising:
   a machine-readable storage medium;
   one or more physical processors;
   a resource inventory comprising information describing a plurality of resources in an information technology datacenter and a plurality of open communication ports on the plurality of resources described in the resource inventory;
   one or more listeners configured to observe one or more network conversations that occur in the datacenter, the one or more network conversations involving the plurality of open communication ports on the plurality of resources described in the resource inventory; and
   a correlation engine that analyzes at least one observed network conversation of the one or more network conversations observed by the one or more listeners for modeling interdependencies in the network datacenter, wherein the correlation engine causes the one or more physical processors to:
   drop the at least one observed network conversation in response to a determination that the at least one observed network conversation fails to correlate with any of the plurality of open communication ports on the plurality of resources described in the resource inventory and further in response to a determination that the at least one observed network conversation comprises a network conversation between one of the resources in the information technology datacenter and a resource outside the information technology datacenter; and
   model a relationship between two of the plurality of resources described in the resource inventory in response to a determination that the at least one observed network conversation correlates with open communication ports on the two resources,
   wherein the correlation engine drops the at least one observed network conversation by no longer observing the network conversation for modeling interdependencies in the network datacenter.

2. The system of claim 1, wherein the at least one observed network conversation includes a first flow directed from an originating resource to a destination resource and a second flow directed from the destination resource to the originating resource.

3. The system of claim 2, wherein the one or more listeners only observe the first flow in the at least one observed network conversation directed from the originating resource to the destination resource.

4. The system of claim 3, wherein the correlation engine causes the one or more processors to determine that the modeled relationship has a directionality from the originating resource to the destination resource in response to locating the destination resource in the resource inventory.

5. The system of claim 2, wherein the correlation engine causes the one or more processors to:
   determine whether the originating resource has a location that falls within a network address range for the information technology datacenter; and
   determine whether the destination resource has a location that falls within the network address range for the information technology datacenter.

6. The system of claim 5, wherein the correlation engine causes the one or more processors - to drop the at least one observed network conversation further in response to the determined location for the originating resource or the determined location for destination resource falling outside the network address range for the information technology datacenter.

7. The system of claim 5, wherein the correlation engine causes the one or more processors to model the relationship between the two resources further in response to the determined location for the originating resource and the determined location for the destination falling within the network address range for the information technology datacenter.

8. The system of claim 1, further comprising a configuration management database configured to store the information contained in the resource inventory and a dependency map describing the modeled relationship.

9. The system of claim 1, wherein the correlation engine causes the one or more processors to validate , in response to dropping the at least one observed network conversation, whether the one or more listeners have previously observed activity that resulted in detection of a security violation.

10. The system of claim 9, wherein the correlation engine causes the one or more processors to de-provision the one or more listeners in response to a determination that the one or more listeners have not previously observed activity that resulted in detection of a security violation.

11. A computer-implemented method of modeling interdependencies in a network datacenter, the method being implemented by one or more physical processors executing one or more computer program instructions which, when executed, perform the method, the method comprising:
discovering a resource inventory with a discovery engine coupled to an information technology datacenter, wherein the resource inventory comprises information describing a plurality of resources in the information technology datacenter and a plurality of open communication ports on the plurality of resources described in the resource inventory;
observing one or more network conversations that occur in the datacenter, the one or more network conversations involving the plurality of open communication ports on the plurality of resources described in the resource inventory by one or more listeners for modeling interdependencies in the network datacenter;
dropping, by the one or more physical processors, at least one observed network conversation of the one or more observed network conversations in response to a determination by a correlation engine that the at least one observed network conversation fails to correlate with any of the plurality of open communication ports on the plurality of resources described in the resource inventory and further in response to a determination that that the at least one observed network conversation comprises a network conversation between one of the resources in the information technology datacenter and a resource outside the information technology datacenter; and
modeling, by the one or more physical processors, a relationship between two of the plurality of resources described in the resource inventory in response to a determination by the correlation engine that the at least one observed network conversation correlates with open communication ports on the two resources,
wherein dropping the at least one observed network conversation comprises no longer observing the network conversation for modeling interdependencies in the network datacenter.

12. The method of claim 11, wherein the at least one observed network conversation includes a first flow directed from an originating resource to a destination resource and a second flow directed from the destination resource to the originating resource.

13. The method of claim 12, wherein the one or more listeners only observe the first flow in the at least one observed network conversation directed from the originating resource to the destination resource.

14. The method of claim 13, further comprising determining that the modeled relationship has a directionality from the originating resource to the destination resource in response to the correlation engine locating the destination resource in the resource inventory.

15. The method of claim 12, further comprising:
determining whether the originating resource has a location that falls within a network address range for the information technology datacenter; and
determining whether the destination resource has a location that falls within the network address range for the information technology datacenter.

16. The method of claim 15, wherein the dropping the at least one observed network conversation is in response to a determination by the correlation engine that the location for the originating resource or the location for destination resource falls outside the network address range for the information technology datacenter.

17. The method of claim 15, wherein the modeling the relationship between the two resources is in response to a determination by the correlation engine that the location for the originating resource and the location for the destination fall within the network address range for the information technology datacenter.

18. The method of claim 11, further comprising populating a configuration management database with the information contained in the resource inventory and a dependency map describing the modeled relationship.

19. The method of claim 11, further comprising validating, in response to the dropping the at least one observed network conversation, whether the one or more listeners have previously observed activity that resulted in detection of a security violation.

20. The method of claim 19, further comprising de-provisioning the one or more listeners in response to a determination by the correlation engine that the one or more listeners have not previously observed activity that resulted in detection of a security violation.

* * * * *